(12) United States Patent
Enomoto

(10) Patent No.: US 6,178,050 B1
(45) Date of Patent: Jan. 23, 2001

(54) ZOOM LENS SYSTEM

(75) Inventor: Takashi Enomoto, Chiba (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/317,617

(22) Filed: May 25, 1999

(30) Foreign Application Priority Data

May 26, 1998 (JP) .................................................. 10-144513

(51) Int. Cl.[7] .................................................. G02B 15/14
(52) U.S. Cl. .......................................... 359/692; 359/684
(58) Field of Search .................................. 359/684, 689, 359/687, 692, 688

(56) References Cited

U.S. PATENT DOCUMENTS

| | | |
|---|---|---|
| 4,836,660 | 6/1989 | Ito . |
| 4,906,077 | 3/1990 | Ito . |
| 4,984,877 | 1/1991 | Ito . |
| 5,164,859 | 11/1992 | Ito . |
| 5,280,390 | 1/1994 | Ito . |
| 5,570,235 | 10/1996 | Yoneyama . |
| 5,751,498 | 5/1998 | Ito . |
| 5,910,860 | 6/1999 | Ozaki et al. . |
| 6,002,528 | * 12/1999 | Tomita .................................. 359/684 |
| 6,016,228 | * 1/2000 | Uzawa .................................. 359/684 |

* cited by examiner

Primary Examiner—Scott J. Sugarman
(74) Attorney, Agent, or Firm—Greenblum & Bernstein, P.L.C.

(57) ABSTRACT

A zoom lens system including a positive first lens group and a negative second lens group in this order from the object side, wherein the distance between the first and second lens groups is varied upon zooming. A middle or rear portion of the positive first lens group is formed as a focusing lens group so that the focusing lens group can be moved along the optical axis without changing the distance between the most-object side lens surface of the first positive lens group and the image plane when focusing is performed.

4 Claims, 17 Drawing Sheets

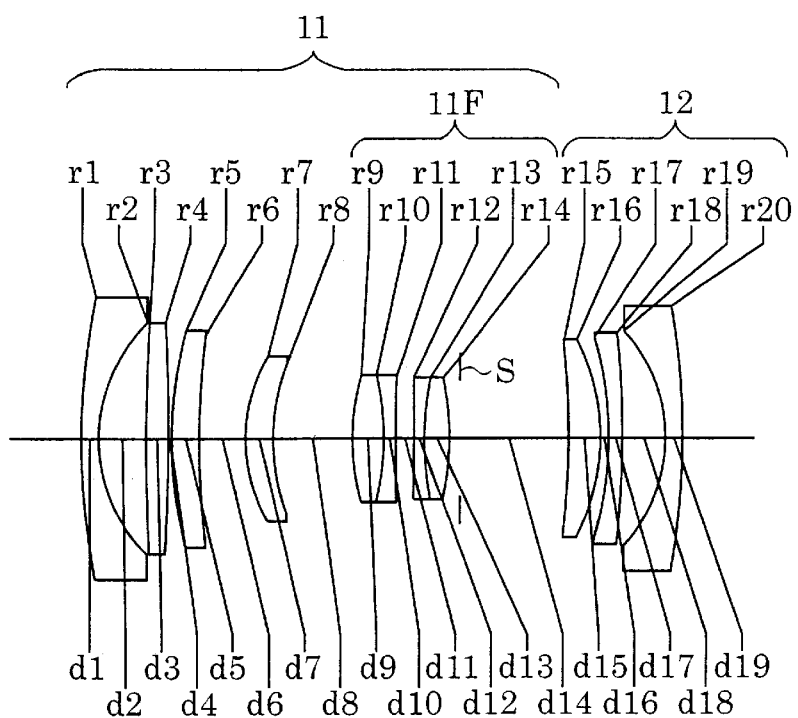
Fig.1
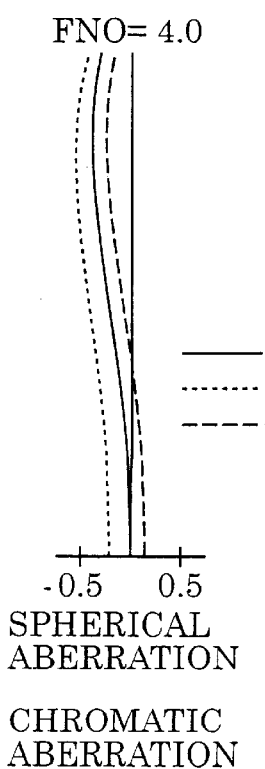
Fig.2A
FNO= 4.0
SPHERICAL
ABERRATION
CHROMATIC
ABERRATION
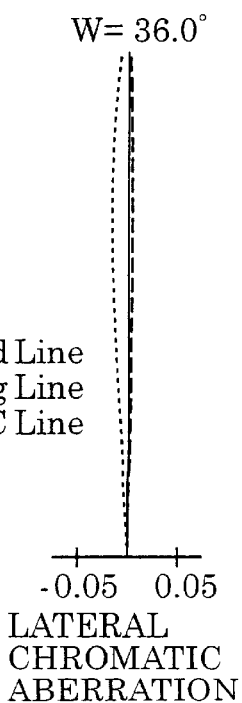
Fig.2B
W= 36.0°
LATERAL
CHROMATIC
ABERRATION
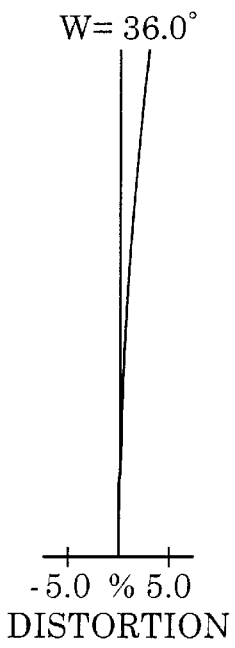
Fig.2C
W= 36.0°
ASTIGMATISM
Fig.2D
W= 36.0°
DISTORTION

FNO= 4.7

-0.5  0.5
SPHERICAL
ABERRATION
CHROMATIC
ABERRATION

— d Line
······ g Line
---- C Line

W=32.1°

-0.05  0.05
LATERAL
CHROMATIC
ABERRATION

W=32.1°

— S
-- M

-0.5  0.5
ASTIGMATISM

W=32.1°

-5.0 % 5.0
DISTORTION

FNO= 6.7

— d Line
······ g Line
---- C Line

-0.5  0.5
SPHERICAL
ABERRATION
CHROMATIC
ABERRATION

W= 24.4°

-0.05  0.05
LATERAL
CHROMATIC
ABERRATION

W= 24.4°

— S
-- M

-0.5  0.5
ASTIGMATISM

W= 24.4°

-5.0 % 5.0
DISTORTION

Fig.5A
FNO= 4.0
Fig.5B
Y= 34.85
Fig.5C
Y= 34.85
Fig.5D
Y= 34.85
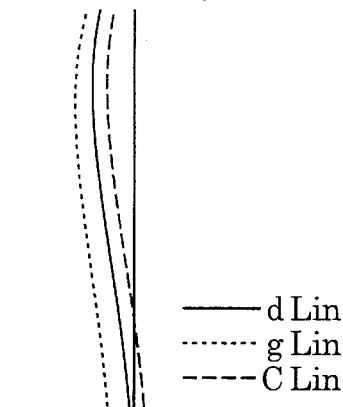
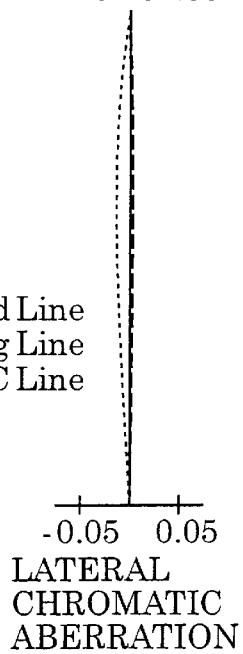
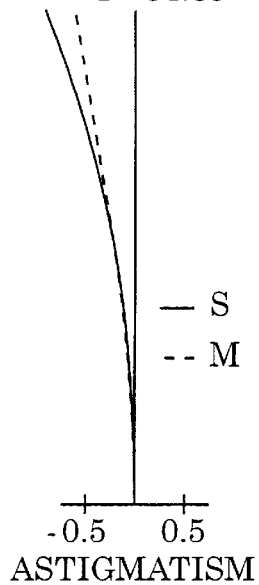
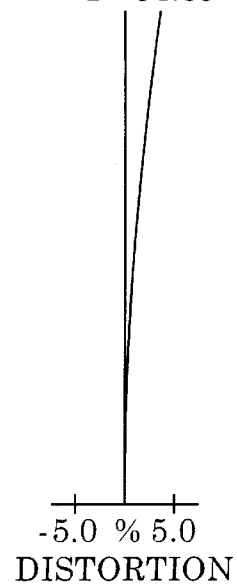
—— d Line
······ g Line
---- C Line
—— S
-- M
-0.5   0.5
SPHERICAL
ABERRATION
CHROMATIC
ABERRATION
-0.05  0.05
LATERAL
CHROMATIC
ABERRATION
-0.5   0.5
ASTIGMATISM
-5.0 % 5.0
DISTORTION
Fig.6A
FNO= 4.7
Fig.6B
Y= 34.85
Fig.6C
Y= 34.85
Fig.6D
Y= 34.85
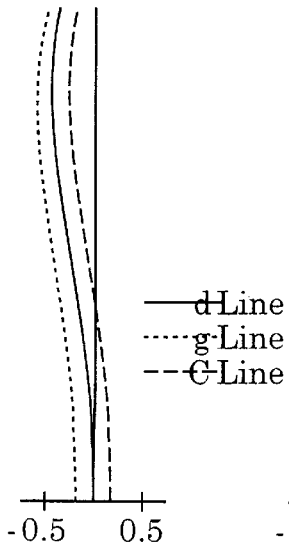
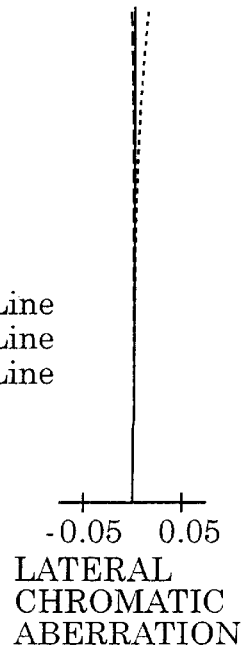
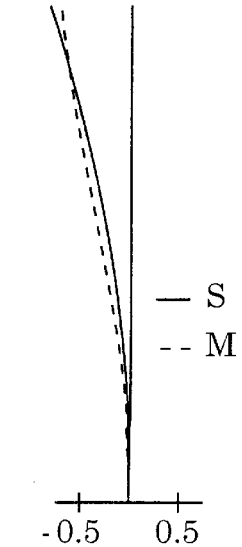
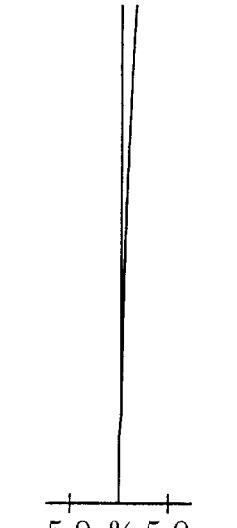
—— d Line
······ g Line
---- C Line
—— S
-- M
-0.5   0.5
SPHERICAL
ABERRATION
CHROMATIC
ABERRATION
-0.05  0.05
LATERAL
CHROMATIC
ABERRATION
-0.5   0.5
ASTIGMATISM
-5.0 % 5.0
DISTORTION

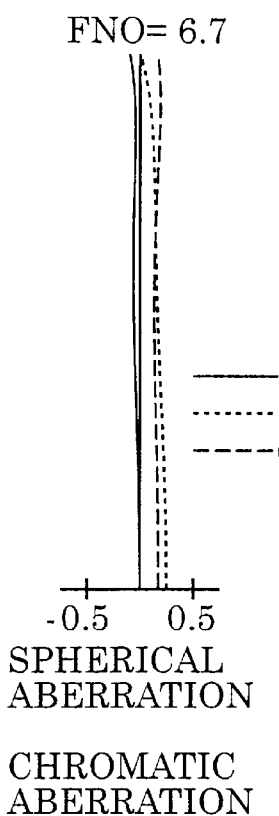
Fig.7A
FNO= 6.7
——— d Line
········· g Line
- - - - C Line
-0.5   0.5
SPHERICAL
ABERRATION
CHROMATIC
ABERRATION
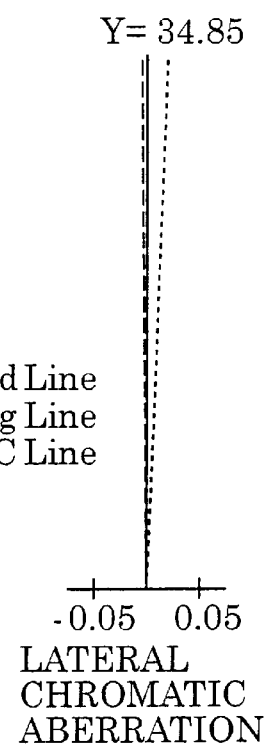
Fig.7B
Y= 34.85
-0.05  0.05
LATERAL
CHROMATIC
ABERRATION
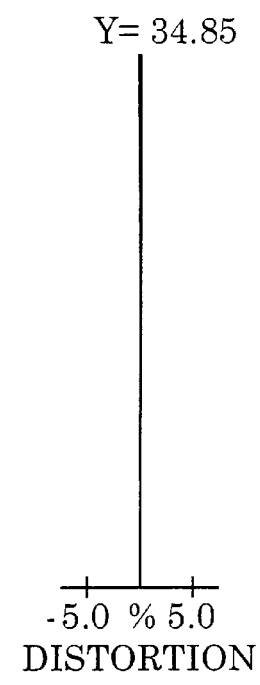
Fig.7C
Y= 34.85
— S
-- M
-0.5   0.5
ASTIGMATISM
Fig.7D
Y= 34.85
-5.0 % 5.0
DISTORTION Fig.8
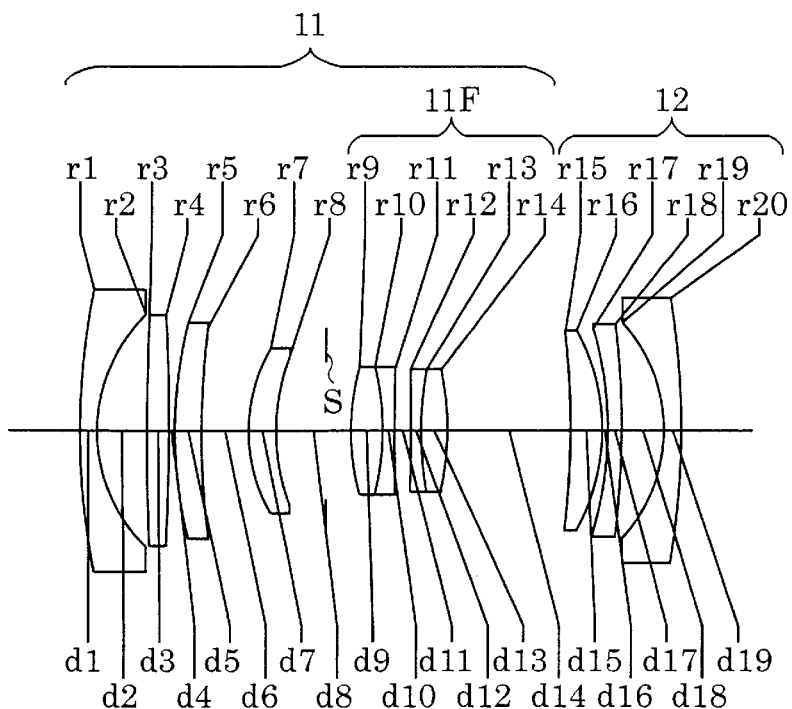
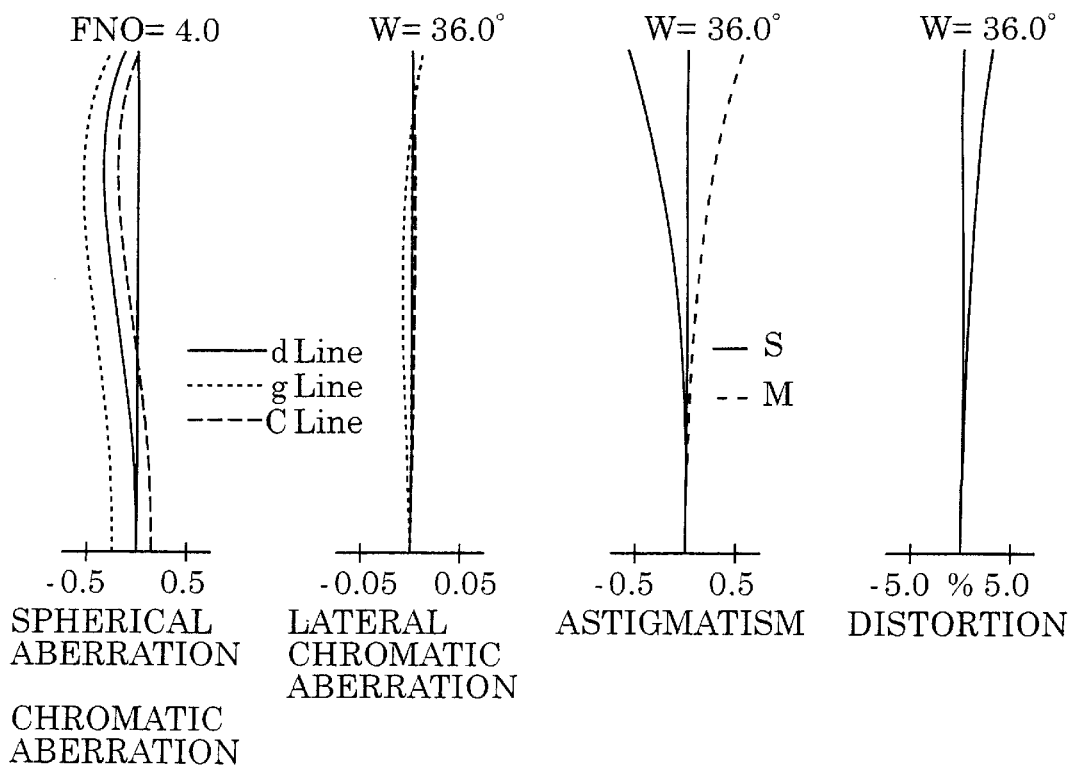
Fig.9A  FNO= 4.0
Fig.9B  W= 36.0°
Fig.9C  W= 36.0°
Fig.9D  W= 36.0°
—— d Line
······· g Line
---- C Line
—— S
-- M
-0.5  0.5
SPHERICAL
ABERRATION
CHROMATIC
ABERRATION
-0.05  0.05
LATERAL
CHROMATIC
ABERRATION
-0.5  0.5
ASTIGMATISM
-5.0 % 5.0
DISTORTION

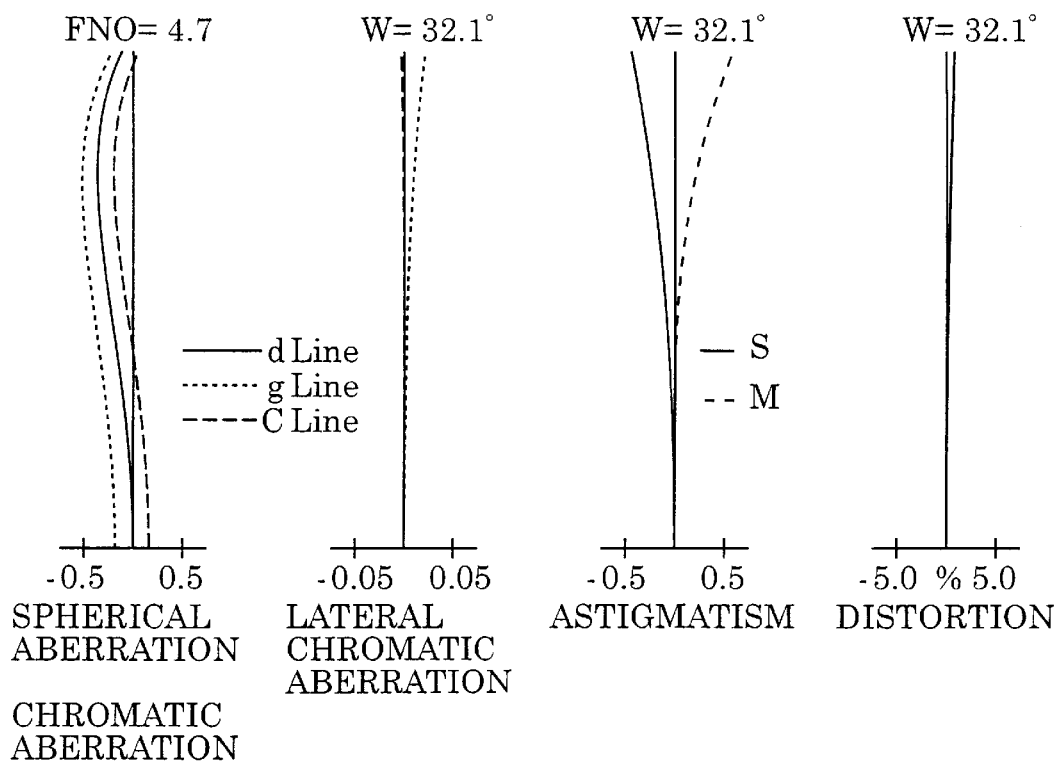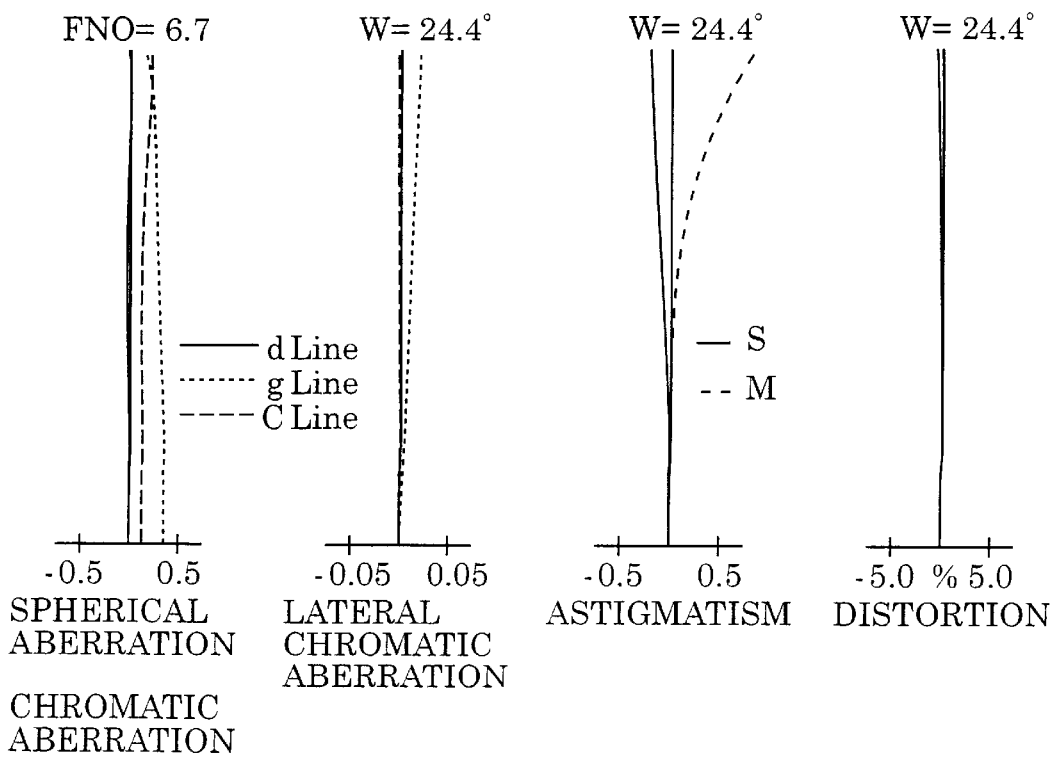

Fig.12A
FNO= 4.0
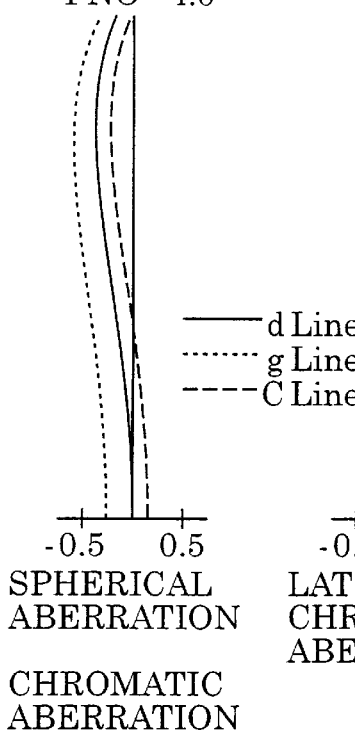
—— d Line
······ g Line
---- C Line
-0.5   0.5
SPHERICAL
ABERRATION
CHROMATIC
ABERRATION
Fig.12B
Y= 34.85
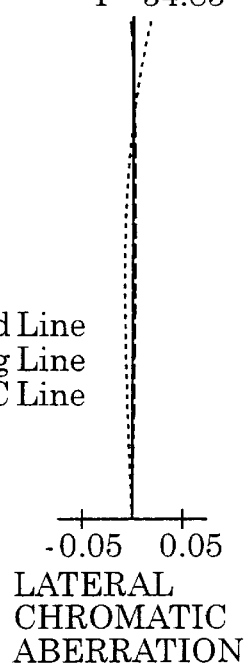
-0.05   0.05
LATERAL
CHROMATIC
ABERRATION
Fig.12C
Y= 34.85
—— S
-- M
-0.5   0.5
ASTIGMATISM
Fig.12D
Y= 34.85
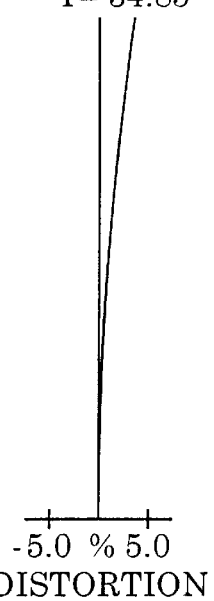
-5.0 % 5.0
DISTORTION
Fig.13A
FNO= 4.7
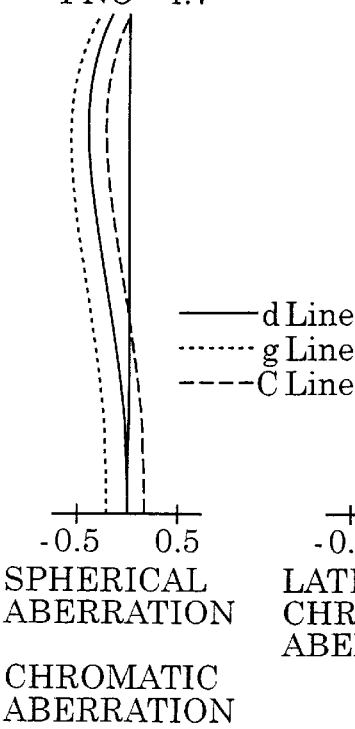
—— d Line
······ g Line
---- C Line
-0.5   0.5
SPHERICAL
ABERRATION
CHROMATIC
ABERRATION
Fig.13B
Y= 34.85
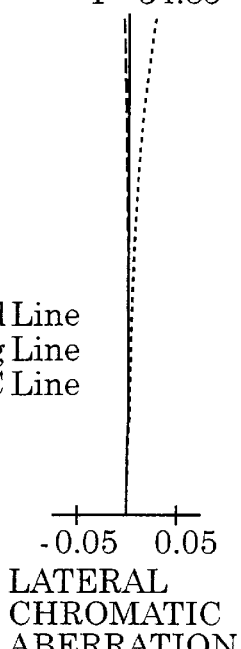
-0.05   0.05
LATERAL
CHROMATIC
ABERRATION
Fig.13C
Y= 34.85
—— S
-- M
-0.5   0.5
ASTIGMATISM
Fig.13D
Y= 34.85
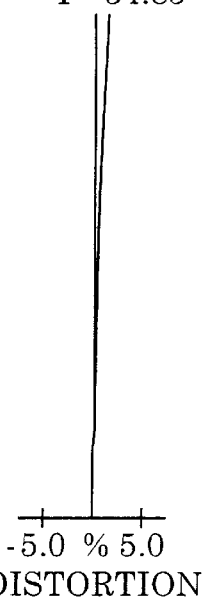
-5.0 % 5.0
DISTORTION Fig.14A  Fig.14B  Fig.14C  Fig.14D
FNO= 6.7  Y= 34.85  Y= 34.85  Y= 34.85
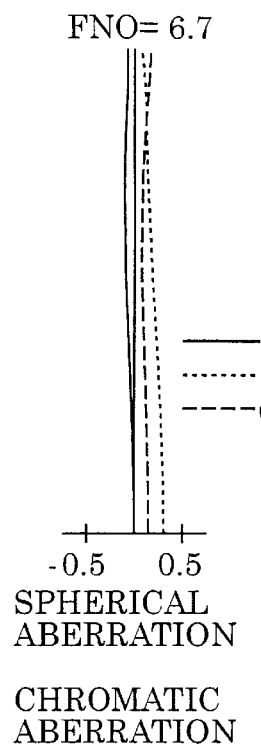
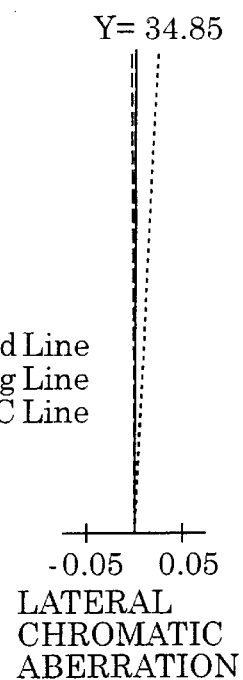
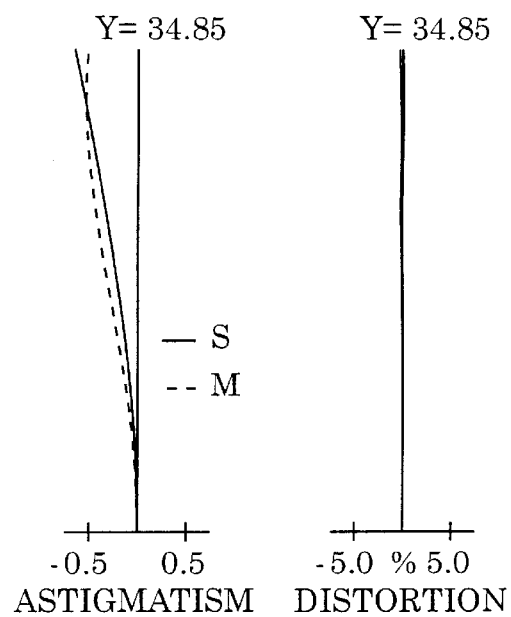
— d Line
······· g Line
- - - C Line
— S
-- M
-0.5  0.5     -0.05  0.05     -0.5  0.5     -5.0 % 5.0
SPHERICAL    LATERAL         ASTIGMATISM    DISTORTION
ABERRATION   CHROMATIC
             ABERRATION
CHROMATIC
ABERRATION Fig. 15
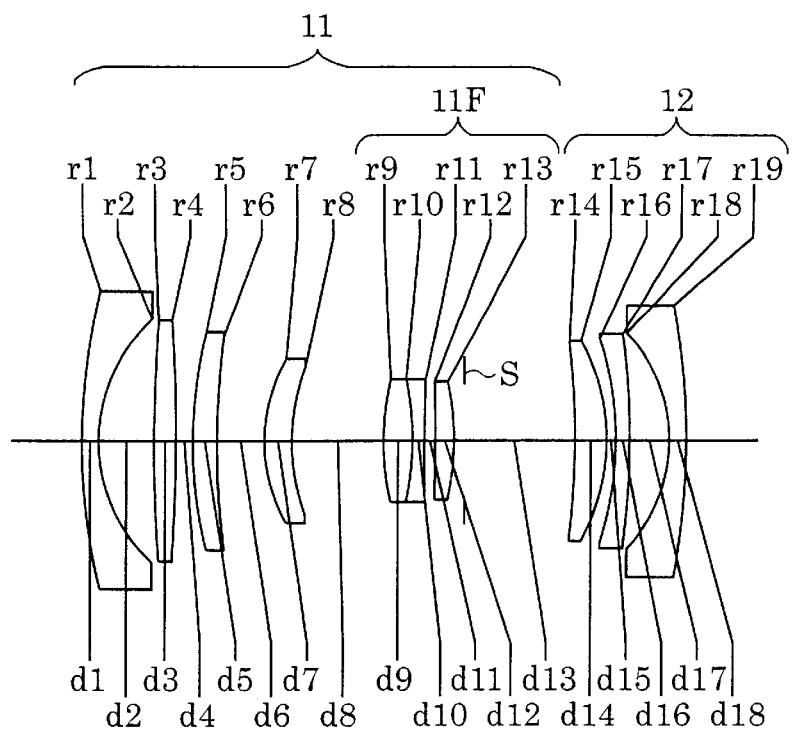
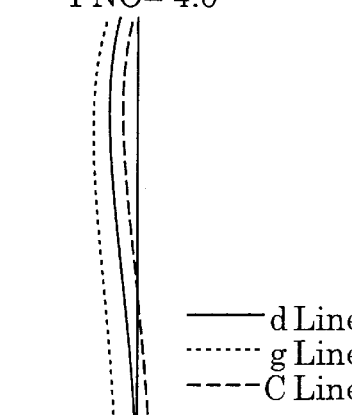
Fig. 16A
FNO= 4.0
—— d Line
······· g Line
---- C Line
-0.5  0.5
SPHERICAL
ABERRATION
CHROMATIC
ABERRATION
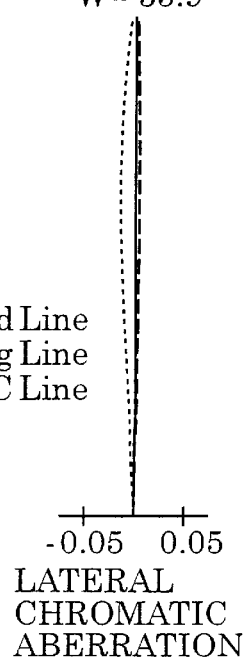
Fig. 16B
W= 35.9°
-0.05  0.05
LATERAL
CHROMATIC
ABERRATION
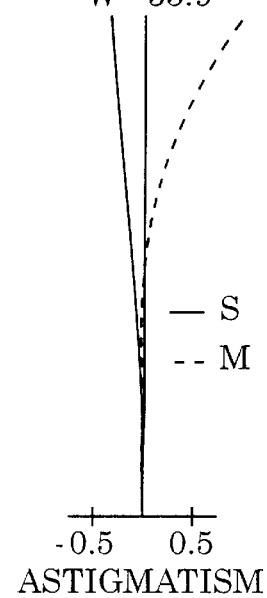
Fig. 16C
W= 35.9°
—— S
-- M
-0.5  0.5
ASTIGMATISM
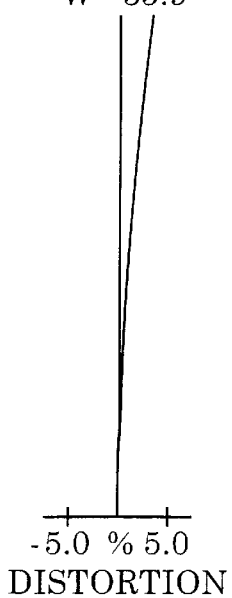
Fig. 16D
W= 35.9°
-5.0 % 5.0
DISTORTION

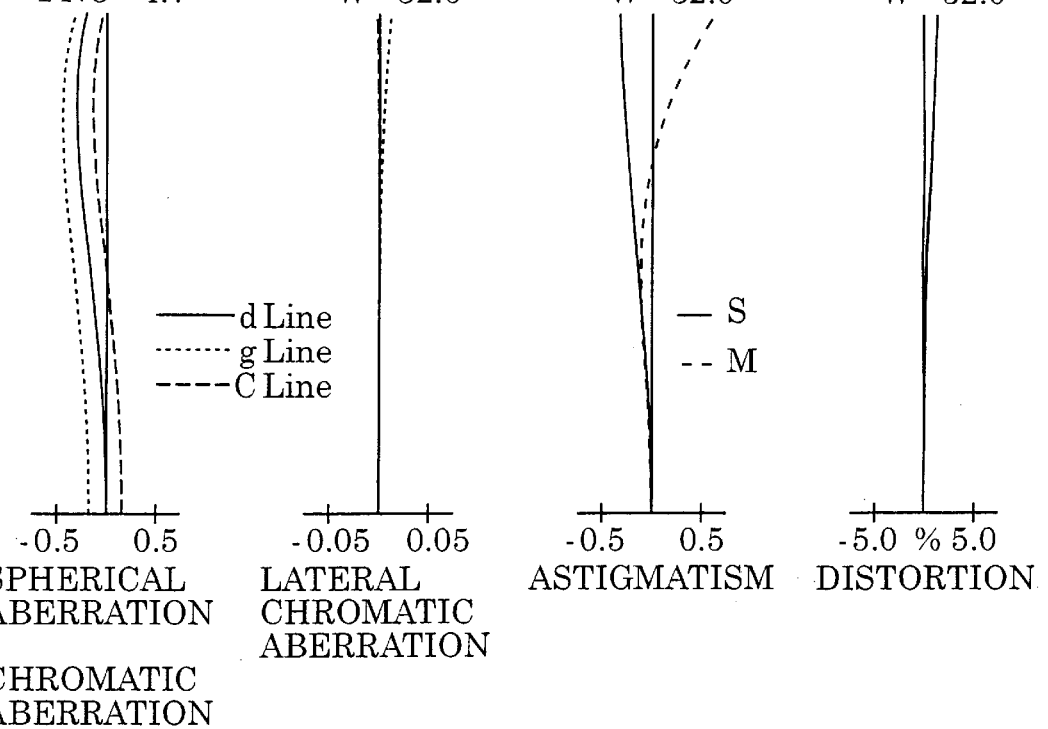
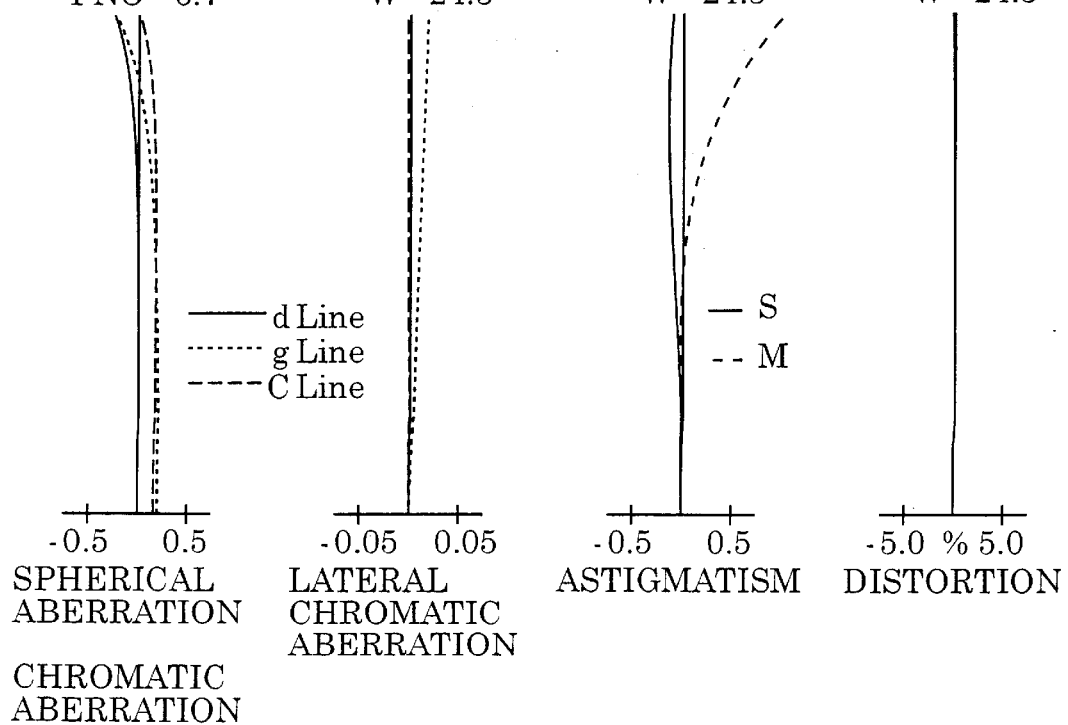

Fig.19A  Fig.19B  Fig.19C  Fig.19D
FNO= 4.0  Y= 34.85  Y= 34.85  Y= 34.85
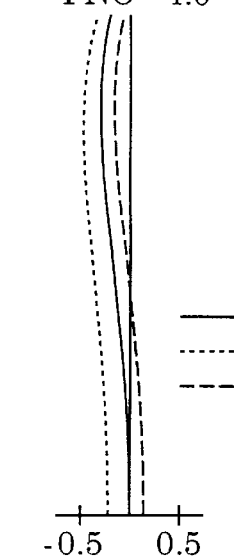
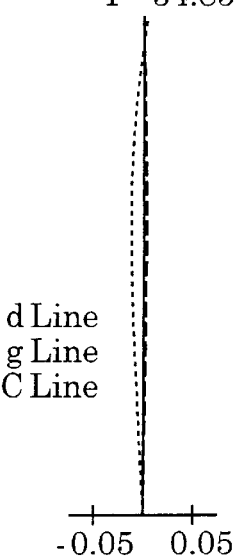
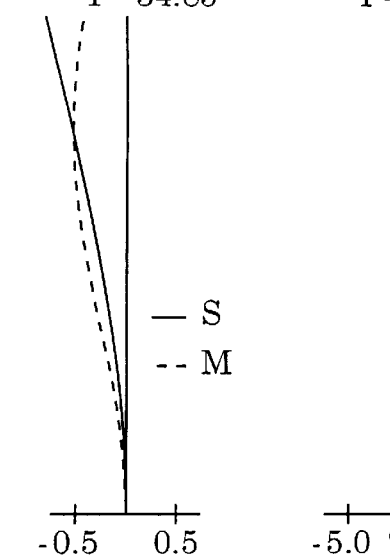
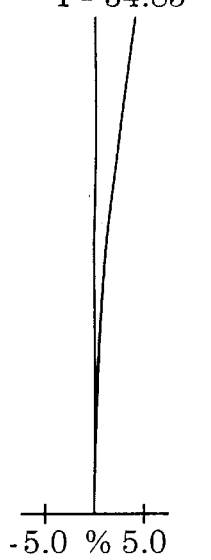
—— d Line
······· g Line
---- C Line
—— S
-- M
-0.5   0.5         -0.05  0.05       -0.5   0.5        -5.0 % 5.0
SPHERICAL         LATERAL            ASTIGMATISM      DISTORTION
ABERRATION        CHROMATIC
                  ABERRATION
CHROMATIC
ABERRATION
Fig.20A  Fig.20B  Fig.20C  Fig.20D
FNO= 4.7  Y= 34.85  Y= 34.85  Y= 34.85
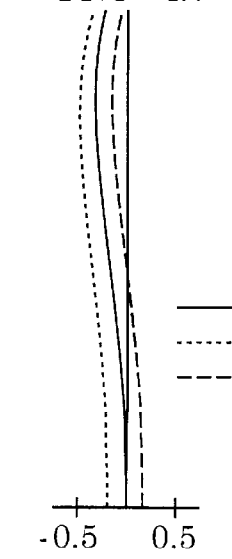
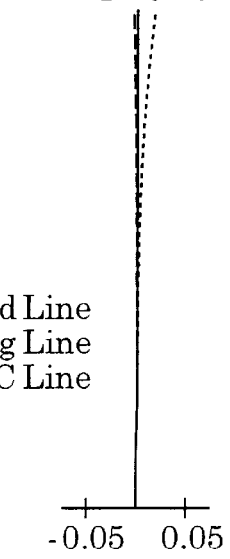
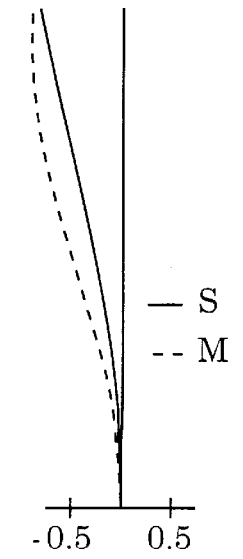
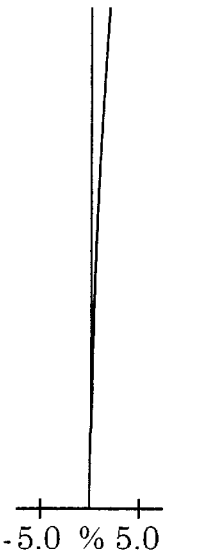
—— d Line
······· g Line
---- C Line
—— S
-- M
-0.5   0.5         -0.05  0.05       -0.5   0.5        -5.0 % 5.0
SPHERICAL         LATERAL            ASTIGMATISM      DISTORTION
ABERRATION        CHROMATIC
                  ABERRATION
CHROMATIC
ABERRATION Fig.21A
FNO= 6.7
Fig.21B
Y= 34.85
Fig.21C
Y= 34.85
Fig.21D
Y= 34.85
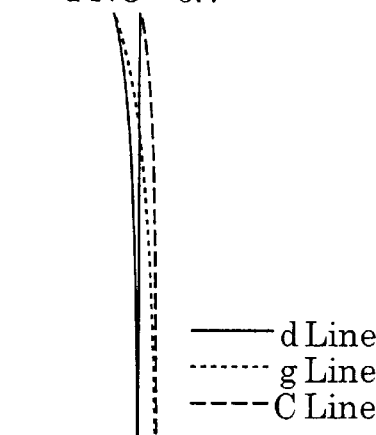
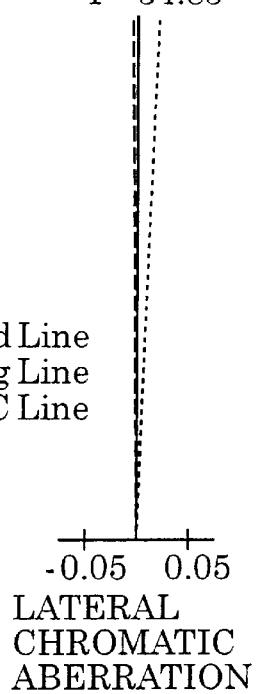
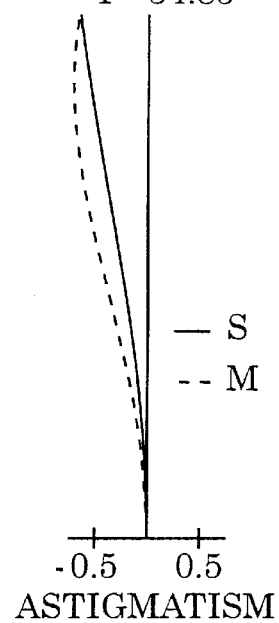
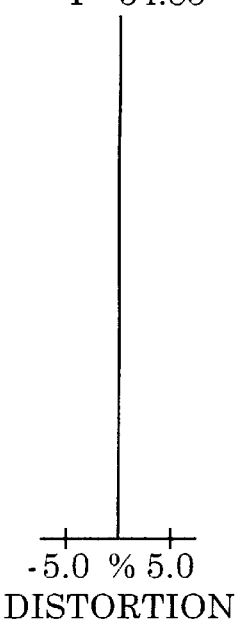
—— d Line
······· g Line
---- C Line
— S
-- M
-0.5  0.5
SPHERICAL
ABERRATION
CHROMATIC
ABERRATION
-0.05  0.05
LATERAL
CHROMATIC
ABERRATION
-0.5  0.5
ASTIGMATISM
-5.0 % 5.0
DISTORTION

FNO= 4.0

—— d Line
······ g Line
---- C Line

-0.5  0.5
SPHERICAL
ABERRATION
CHROMATIC
ABERRATION

W= 36.0°

-0.05  0.05
LATERAL
CHROMATIC
ABERRATION

W= 36.0°

— S
-- M

-0.5  0.5
ASTIGMATISM

W= 36.0°

-5.0 % 5.0
DISTORTION

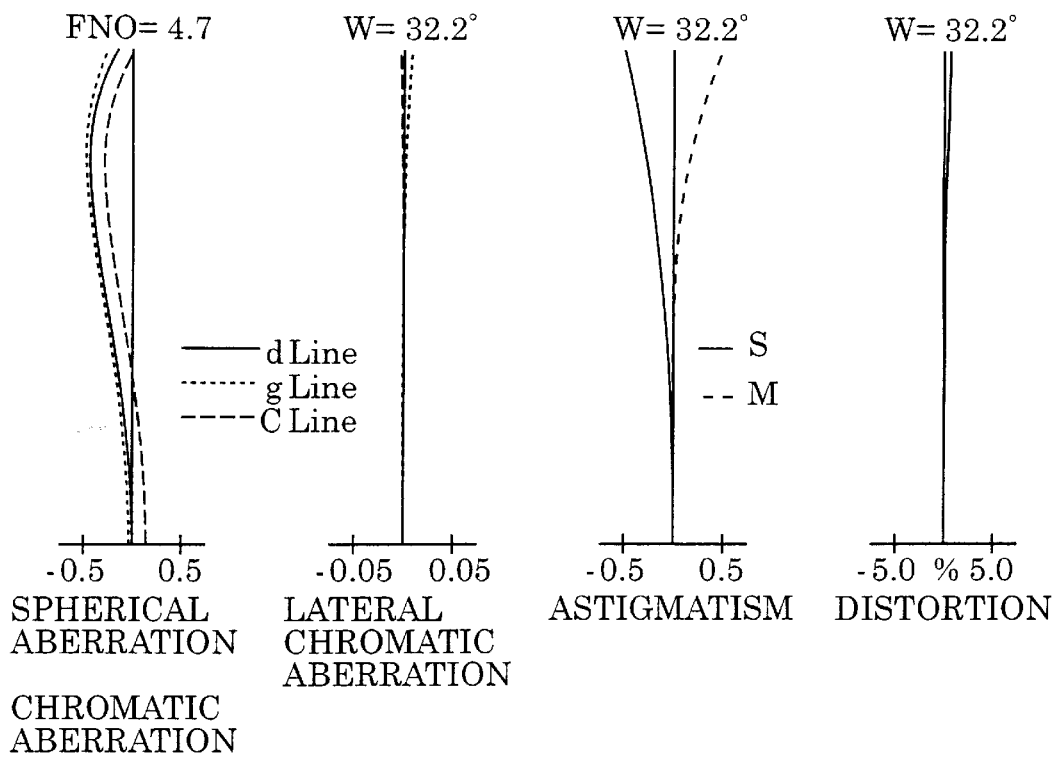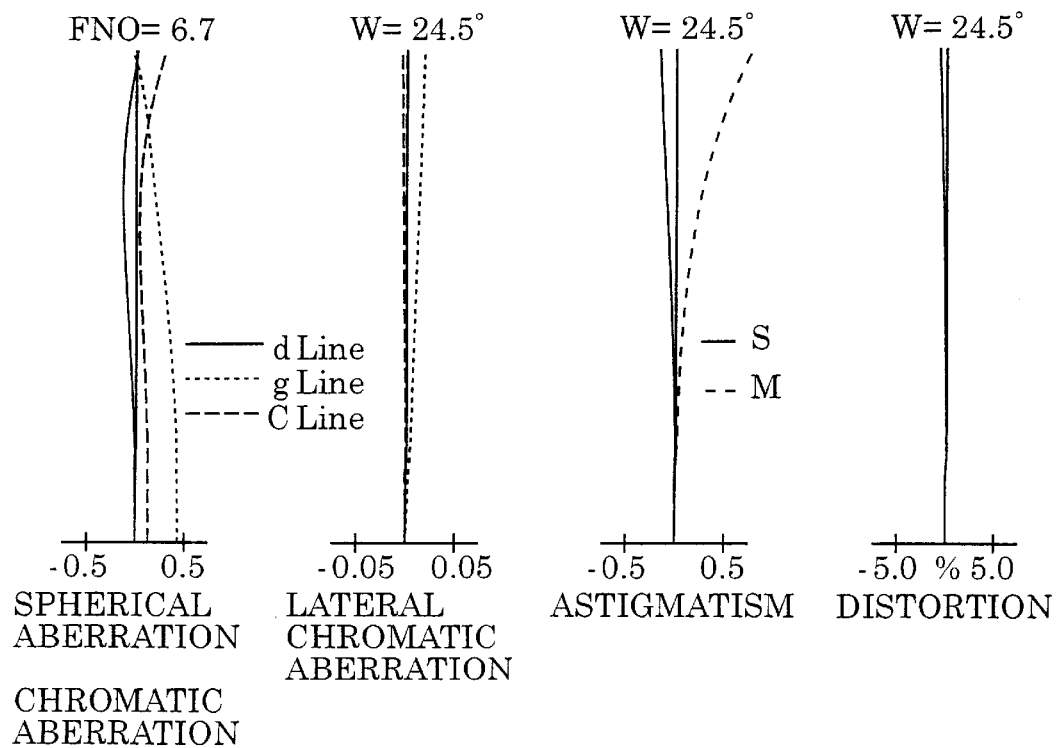

Fig.26A FNO= 4.0
Fig.26B Y= 34.85
Fig.26C Y= 34.85
Fig.26D Y= 34.85
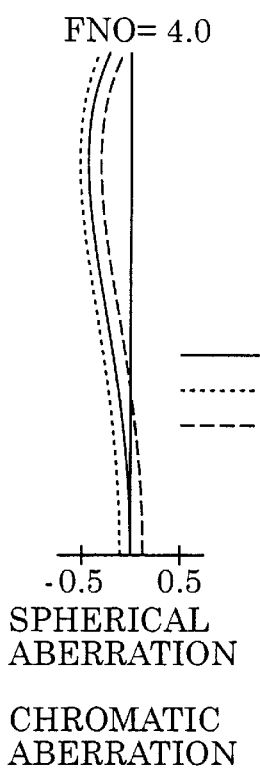
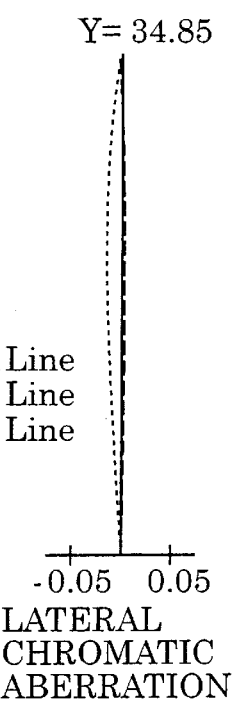
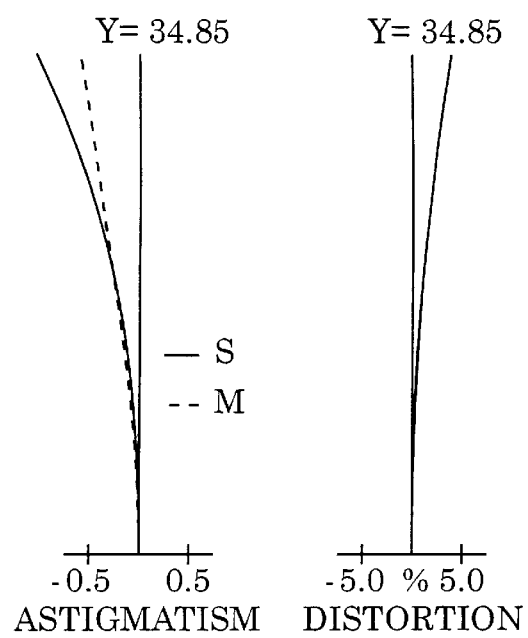
-0.5   0.5
SPHERICAL
ABERRATION
CHROMATIC
ABERRATION
-0.05   0.05
LATERAL
CHROMATIC
ABERRATION
-0.5   0.5
ASTIGMATISM
-5.0 % 5.0
DISTORTION
Fig.27A FNO= 4.7
Fig.27B Y= 34.85
Fig.27C Y= 34.85
Fig.27D Y= 34.85
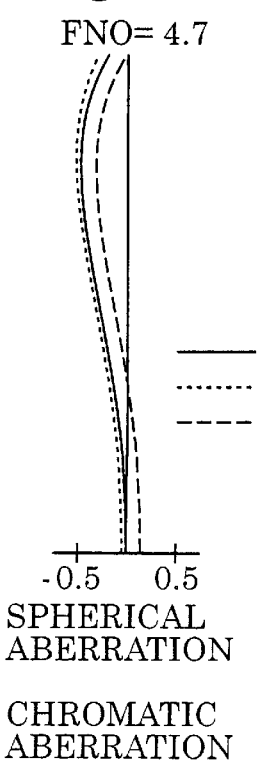
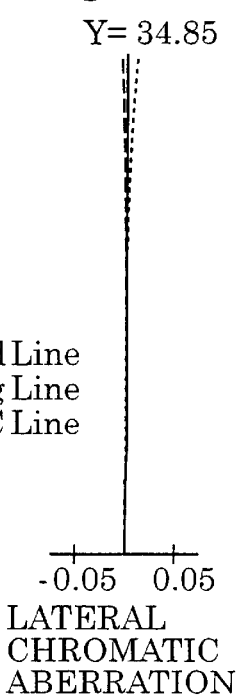
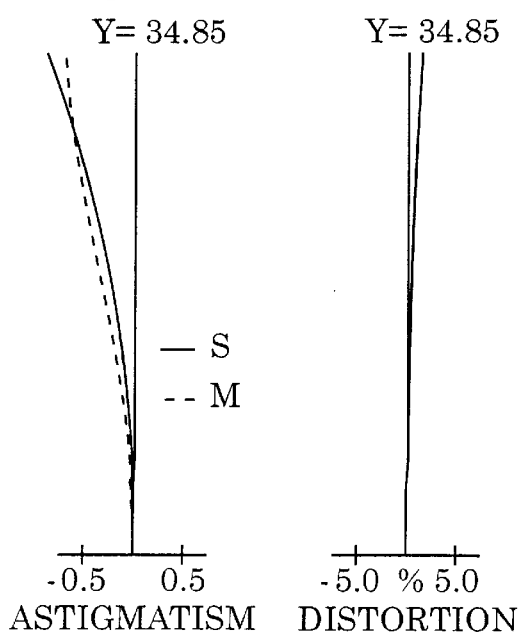
-0.5   0.5
SPHERICAL
ABERRATION
CHROMATIC
ABERRATION
-0.05   0.05
LATERAL
CHROMATIC
ABERRATION
-0.5   0.5
ASTIGMATISM
-5.0 % 5.0
DISTORTION Fig.28A  Fig.28B  Fig.28C  Fig.28D
FNO= 6.7  Y= 34.85  Y= 34.85  Y= 34.85
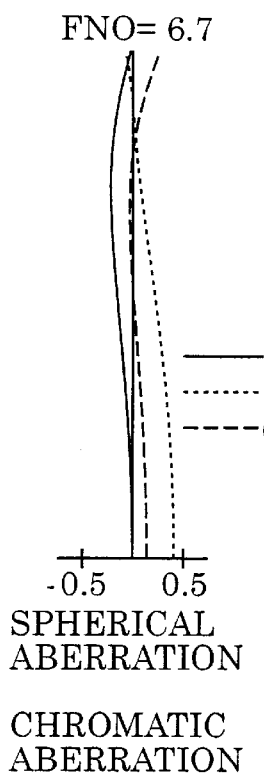
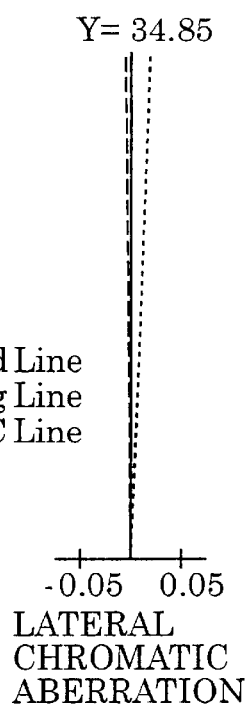
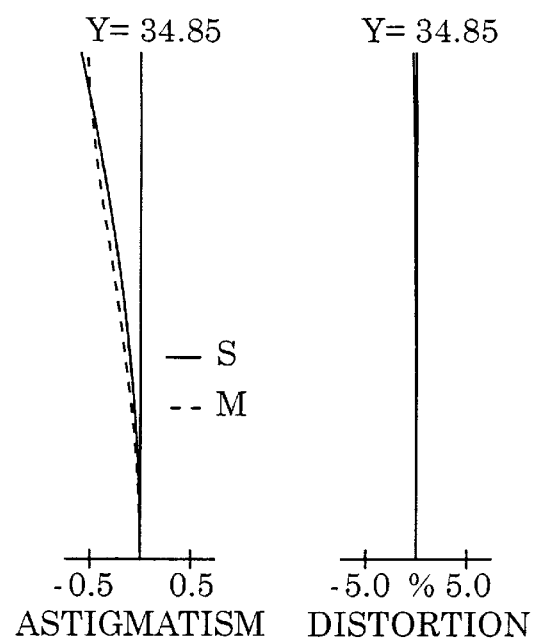
— d Line
······ g Line
---- C Line
— S
-- M
-0.5  0.5
SPHERICAL
ABERRATION
-0.05  0.05
LATERAL
CHROMATIC
ABERRATION
-0.5  0.5
ASTIGMATISM
-5.0 % 5.0
DISTORTION
CHROMATIC
ABERRATION

ZOOM LENS SYSTEM

BACKGROUND OF THE INVENTION

1. Field of the Invention

The present invention relates to a zoom lens system in which a back focal distance can be short.

2. Description of the Related Art

In a zoom lens system in which a back focal distance can be short (e.g., a zoom lens system for a compact camera), there is no need to provide a longer back focal distance unlike a zoom lens system for a single lens reflex (SLR) camera, which requires a space for providing a mirror behind the photographing lens. Accordingly, a compact camera generally employs a telephoto type lens system in which positive and negative lens groups are provided in this order from the object side while a retrofocus type lens system, which includes negative and positive lens groups in this order from the object side, is generally employed in a SLR camera.

A telephoto two-lens group zoom lens system, which has a positive front lens group and a negative rear lens group, is simple, easy to adjust upon assembly, can reduce the number of lens elements, and is beneficial from the viewpoint of cost. However, in order to decrease the F-number at the long focal length extremity and to achieve high optical performance, aberration correction of the front lens group becomes the utmost importance, and the number of lens elements of the positive front lens group increases. Accordingly, the front lens group becomes heavy, so that the focusing mechanism has to bear a load.

SUMMARY OF THE INVENTION

It is an object of the present invention to provide a two-lens group zoom lens system wherein even if the front lens group includes an increased number of lens elements in order to provide improved optical performance, a load otherwise exerted to the focusing mechanism can substantially be removed.

In order to achieve the above-mentioned object, there is provided a zoom lens system including a positive first lens group and a negative second lens group in this order from the object side, wherein the distance between the first and second lens groups is varied upon zooming. A middle or rear portion of the positive first lens group is formed as a focusing lens group so that the focusing lens group can be moved along the optical axis without changing the distance between the most-object side lens surface of the first positive lens group and the image plane when focusing is performed.

The zoom lens system preferably satisfies the following condition:

$$0.5 < f_{1G}/f_F < 1.2 \quad (1)$$

wherein $f_{1G}$ designates the focal length of the positive first lens group; and $f_F$ designates the focal length of the focusing lens group in the positive first lens group.

In addition to, or regardless of condition (1), the zoom lens system preferably satisfies the following condition:

$$0.1 < \Sigma d_F / \Sigma d_{1G} < 0.8 \quad (2)$$

wherein $\Sigma d_F$ designates the distance between the most object-side lens surface and the most image-side lens surface of the focusing lens group in the positive first lens group; and $\Sigma d_{1G}$ designates the distance between the most object-side lens surface and the most image-side lens surface of the positive first lens group.

The present disclosure relates to subject matter contained in Japanese Patent Application No.10-144513 (filed on May 26, 1998) which is expressly incorporated herein by reference in its entirety.

BRIEF DESCRIPTION OF THE DRAWINGS

The invention will be discussed below in detail with reference to the accompanying drawings, in which:

FIG. 1 is a lens arrangement of the first embodiment of a zoom lens system according to the present invention;

FIGS. 2A, 2B, 2C and 2D are aberration diagrams, at the short focal length extremity, of the zoom lens system shown in FIG. 1 when the zoom lens system is focused on an object at infinity;

FIGS. 5A, 5B, 5C and 5D are aberration diagrams, at the short focal length extremity, of the zoom lens system shown in FIG. 1 when the zoom lens system is focused on an object at a finite distance (a distance between the object and an image is 2.45 meters);

FIGS. 6A, 6B, 6C and 6D are aberration diagrams, at an intermediate focal length, of the zoom lens system shown in FIG. 1 when the zoom lens system is focused on an object at a finite distance (a distance between the object and an image is 2.45 meters);

FIGS. 7A, 7B, 7C and 7D are aberration diagrams, at the long focal length extremity, of the zoom lens system shown in FIG. 1 when the zoom lens system is focused on an object at a finite distance (a distance between the object and an image is 2.45 meters);

FIG. 8 is a lens arrangement of the second embodiment of a zoom lens system according to the present invention;

FIGS. 9A, 9B, 9C and 9D are aberration diagrams, at the short focal length extremity, of the zoom lens system shown in FIG. 8 when the zoom lens system is focused on an object at infinity;

FIGS. 10A, 10B, 10C and 10D are aberration diagrams, at an intermediate focal length, of the zoom lens system shown in FIG. 8 when the zoom lens system is focused on an object at infinity;

FIGS. 11A, 11B, 11C and 11D are aberration diagrams, at the long focal length extremity, of the zoom lens system shown in FIG. 8 when the zoom lens system is focused on an object at infinity;

FIGS. 12A, 12B, 12C and 12D are aberration diagrams, at the short focal length extremity, of the zoom lens system shown in FIG. 8 when the zoom lens system is focused on an object at a finite distance (a distance between the object and an image is 2.45 meters);

FIGS. 13A, 13B, 13C and 13D are aberration diagrams, at an intermediate focal length, of the zoom lens system shown in FIG. 8 when the zoom lens system is focused on an object at a finite distance (a distance between the object and an image is 2.45 meters);

FIGS. 14A, 14B, 14C and 14D are aberration diagrams, at the long focal length extremity, of the zoom lens system shown in FIG. 8 when the zoom lens system is focused on an object at a finite distance (a distance between the object and an image is 2.45 meters);

FIG. 15 is a lens arrangement of the third embodiment of a zoom lens system according to the present invention;

FIGS. 16A, 16B, 16C and 16D are aberration diagrams, at the short focal length extremity, of the zoom lens system shown in FIG. 15 when the zoom lens system is focused on an object at infinity;

FIGS. 17A, 17B, 17C and 17D are aberration diagrams, at an intermediate focal length, of the zoom lens system shown in FIG. 15 when the zoom lens system is focused on an object at infinity;

FIGS. 18A, 18B, 18C and 18D are aberration diagrams, at the long focal length extremity, of the zoom lens system shown in FIG. 15 when the zoom lens system is focused on in object at infinity;

FIGS. 19A, 19B, 19C and 19D are aberration diagrams, at the short focal length extremity, of the zoom lens system shown in FIG. 15 when the zoom lens system is focused on an object at a finite distance (a distance between the object and an image is 2.45 meters);

FIGS. 20A, 20B, 20C and 20D are aberration diagrams, at an intermediate focal length, of the zoom lens system shown in FIG. 15 when the zoom lens system is focused on an object at a finite distance (a distance between the object and an image is 2.45 meters);

FIGS. 21A, 21B, 21C and 21D are aberration diagrams, at the long focal length extremity, of the zoom lens system shown in FIG. 15 when the zoom lens system is focused on an object at a finite distance (a distance between the object and an image is 2.45 meters);

FIGS. 24A, 24B, 24C and 24D are aberration diagrams, at an intermediate focal length, of the zoom lens system shown in FIG. 22 when the zoom lens system is focused on an object at infinity;

FIGS. 25A, 25B, 25C and 25D are aberration diagrams, at the long focal length extremity, of the zoom lens system shown in FIG. 22 when the zoom lens system is focused on an object at infinity;

FIGS. 26A, 26B, 26C and 26D are aberration diagrams, at the short focal length extremity, of the zoom lens system shown in FIG. 22 when the zoom lens system is focused on an object at a finite distance (a distance between the object and an image is 2.45 meters);

FIGS. 27A, 27B, 27C and 27D are aberration diagrams, at an intermediate focal length, of the zoom lens system shown in FIG. 22 when the zoom lens system is focused on an object at a finite distance (a distance between the object and an image is 2.45 meters);

FIGS. 28A, 28B, 28C and 28D are aberration diagrams, at the long focal length extremity, of the zoom lens system shown in FIG. 22 when the zoom lens system is focused on an object at a finite distance (a distance between the object and an image is 2.45 meters);

DESCRIPTION OF THE PREFERRED EMBODIMENTS

Figure 29:
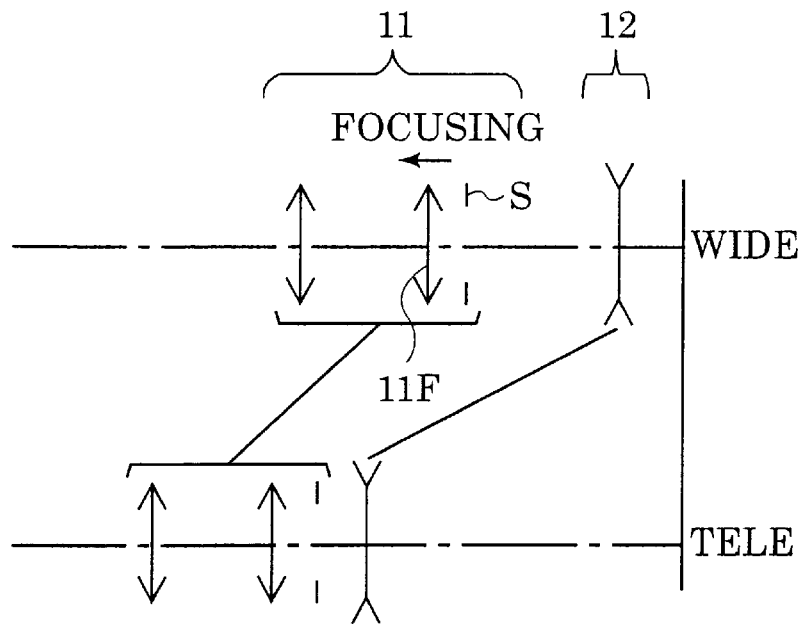
FIG. 29 is the traveling paths the of the zoom lens system according to the present invention.
Figure 30:
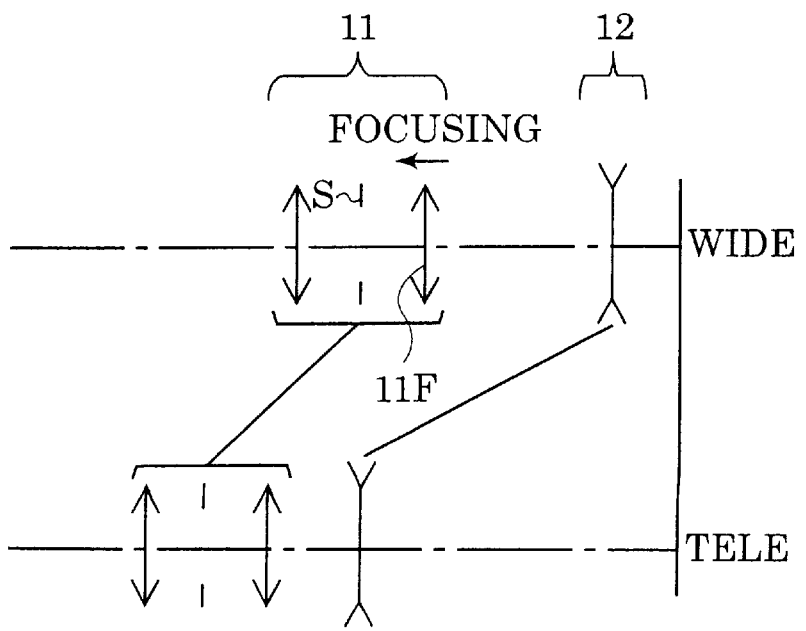
FIG. 30 is the traveling paths the of the zoom lens system according to the present invention.

A zoom lens system is composed of a positive first lens group and a negative second lens group, in this order from the object side. Zooming is performed by varying the distance between the first and second lens groups. For focusing, a portion of the first lens group is moveable along the optical axis without changing the entire length of the zoom lens system. FIGS. 29 and 30 show the traveling paths of the zoom lens system. Upon zooming from the short focal length extremity to the long focal length extremity, the positive first lens group 11 and the negative second lens group 12 move together toward the object whilst decreasing the distance therebetween. Furthermore, either the middle portion or the rear portion of the positive first lens group is formed as a focusing lens group 11F. At any focal length of the zoom lens system, focusing is performed by moving the focusing lens group 11F along the optical axis. By forming the middle portion or the rear portion of the positive first lens group as a focusing lens group 11F, the entire length of the zoom lens system does not change during focusing being performed. In other words, the distance from the most-object side lens surface of the positive first lens group to the most-image side lens surface of the negative second lens group does not change. A diaphragm S can be positioned at the most-image side of the first lens group 11 as shown in FIG. 29. Alternatively, the diaphragm S can be positioned within the first lens group 11 as shown in FIG. 30. In either case, the diaphragm moves with the positive first lens group during zooming, and does not move when focusing is performed.

According to the above-mentioned way of focusing, even if the F-number is small (i.e., a large amount of light is collected), aberrations in the positive first lens group 11 can be sufficiently reduced, which can obtain optimum optical performance. Furthermore, since focusing is carried out in a portion of the positive first lens group 11, a load otherwise exerted to the focusing mechanism can substantially be removed.

Condition (1) specifies the power of the focusing lens group 11F in the positive first lens group 11. When this condition is satisfied, focusing precision is improved, and the zoom lens system can be made more compact.

If $f_{1G}/f_F$ exceeds the upper limit, the sensitivity of the focusing lens group 11F becomes too great, which cannot enhance focusing precision. If $f_{1G}/f_F$ exceeds the lower limit, a required traveling distance of the focusing lens group 11F becomes too long, which enlarges the entire lens system.

Condition (2) specifies the size of the focusing lens group 11F. When this condition is satisfied, aberrations that occur during focusing can be corrected, and a load otherwise exerted to the focusing mechanism can substantially be removed.

If $\Sigma d_F/\Sigma d_{1G}$ exceeds the upper limit, the focusing lens group 11F becomes too large, and a load exerted to the focusing mechanism also increases. If $\Sigma d_F/\Sigma d_{1G}$ exceeds the lower limit, aberrations in the focusing lens group 11F increase, and aberrations that occur during focusing cannot be corrected.

Specific numerical data of the embodiments will be described below via the tables and diagrams. In the diagrams of chromatic aberration (axial chromatic aberration) represented by spherical aberrations, the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. $F_{NO}$ designates the F-number, f designates the focal length of the entire zoom lens system, W designates the half angle-of-view, and $f_B$ designates the back focal distance. R designates the radius of curvature of each lens surface, D designates the lens thickness or distance, $N_d$ designates refractive index with respect to the d-line, $v_d$ designates the Abbe number.

In addition to the above, an aspherical surface which is symmetrical with respect to the optical axis is defined as follows:

$$x=Ch^2/\{1+[1-(1+K)C^2h^2]^{1/2}\}=A4h^4+A6h^6+A8h^8+A10h^{10}$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient;

A10 designates a tenth-order aspherical coefficient.

Embodiment 1

FIG. 1 shows the lens arrangement of the first embodiment. FIGS. 2A, 2B, 2C and 2D, FIGS. 3A, 3B, 3C and 3D, and FIGS. 4A, 4B, 4C and 4D are aberration diagrams, at the short focal length extremity, an intermediate focal length, and at the long focal length extremity, of the lens arrangement shown in FIG. 1 when the zoom lens system is focused on an object at infinity. FIGS. 5A, 5B, 5C and 5D, FIGS. 6A, 6B, 6C and 6D, and FIGS. 7A, 7B, 7C and 7D are aberration diagrams, at the short focal length extremity, an intermediate focal length, and at the long focal length extremity, of the zoom lens system shown in FIG. 1 when the zoom lens system is focused on an object at a finite distance (a distance between the object and an image is 2.45 meters). Table 1 shows the numerical data of the above. Surfaces 1 through 14 are those of the positive first lens group 11, surfaces 15 through 20 are those of the negative second lens group 12. Surfaces 9 through 14 within the first lens group are those of the focusing lens group 11F.

TABLE 1

$F_{NO} = 1:4.0-4.7-6.7$
f = 46.60 −55.00 −77.20
W = 36.0°-32.1°-24.4°
$f_B$ = 19.96-30.80-59.47

| Surface No. | R | D | $N_d$ | $v_d$ |
|---|---|---|---|---|
| 1 | 83.338 | 2.00 | 1.70806 | 55.2 |
| 2 | 19.136 | 5.48 | — | — |
| 3 | 268.777 | 2.60 | 1.49000 | 69.8 |
| 4 | −230.525 | 0.42 | — | — |
| 5 | 50.393 | 3.20 | 1.61969 | 43.8 |
| 6 | 103.402 | 5.37 | — | — |
| 7 | 19.412 | 3.20 | 1.67243 | 40.6 |
| 8 | 25.220 | 9.21–9.21–9.21(∞) 8.79–8.79–8.79(finite) | — | — |
| 9 | 27.989 | 3.64 | 1.51639 | 54.2 |
| 10 | −31.180 | 1.40 | 1.80518 | 25.4 |

TABLE 1-continued $F_{NO} = 1:4.0-4.7-6.7$
f = 46.60 −55.00 −77.20
W = 36.0°-32.1°-24.4°
$f_B$ = 19.96-30.80-59.47

| Surface No. | R | D | $N_d$ | $v_d$ |
|---|---|---|---|---|
| 11* | 492.794 | 2.12 | — | — |
| 12 | −390.209 | 1.20 | 1.74100 | 45.8 |
| 13 | 38.197 | 2.88 | 1.74270 | 46.6 |
| 14* | −31.694 | 1.20-1.20-1.20(∞) 1.62-1.62-1.62(finite) | — | — |
| Diaphragm | ∞ | 12.65-8.56-2.03(∞) 12.65-8.56-2.03(finite) | — | — |
| 15* | −98.720 | 3.70 | 1.60025 | 38.4 |
| 16 | −25.068 | 0.97 | — | — |
| 17 | −41.182 | 1.60 | 1.77840 | 52.0 |
| 18 | −106.824 | 5.00 | — | — |
| 19 | −18.604 | 2.00 | 1.77874 | 47.9 |
| 20 | −88.731 | — | — | — |

\* designates the aspherical surface which is symmetrical with respect to the optical axis.

Aspherical surface data (the aspherical surface coefficients not indicated are zero (0.00)):

| Surface No. | K | A4 | A6 | A8 |
|---|---|---|---|---|
| 11 | 0.00 | $0.3191 \times 10^{-8}$ | $-0.1025 \times 10^{-7}$ | $0.9042 \times 10^{-10}$ |
| 14 | 0.00 | $0.1497 \times 10^{-4}$ | $0.5570 \times 10^{-7}$ | $-0.1486 \times 10^{-9}$ |
| 15 | 0.00 | $-0.7854 \times 10^{-6}$ | $0.4876 \times 10^{-8}$ | $-0.1834 \times 10^{-11}$ |

Embodiment 2

FIG. 8 shows the lens arrangement of the second embodiment. FIGS. 9A, 9B, 9C and 9D, FIGS. 10A, 10B, 10C and 10D, and FIGS. 11A, 11B, 11C and 11D are aberration diagrams, at the short focal length extremity, an intermediate focal length, and at the long focal length extremity, of the lens arrangement shown in FIG. 8 when the zoom lens system is focused on an object at infinity. FIGS. 12A, 12B, 12C and 12D, FIGS. 13A, 13B, 13C and 13D and FIGS. 14A, 14B, 14C and 14D are aberration diagrams, at the short focal length extremity, an intermediate focal length, and at the long focal length extremity, of the zoom lens system shown in FIG. 8 when the zoom lens system is focused on an object at a finite distance (a distance between the object and an image is 2.45 meters). Table 2 shows the numerical data of the above. Surfaces 1 through 14 are those of the positive first lens group 11, surfaces 15 through 20 are those of the negative second lens group 12. Surfaces 9 through 14 within the first lens group are those of the focusing lens group 11F.

TABLE 2

$F_{NO} = 1:4.0-4.7-6.7$
f = 46.60-55.00-77.20
W = 36.0°-32.1°-24.4°
$f_B$ = 20.50-31.71-61.32

| Surface No. | R | D | $N_d$ | $v_d$ |
|---|---|---|---|---|
| 1 | 82.971 | 2.00 | 1.69680 | 55.5 |
| 2 | 19.002 | 5.83 | — | — |
| 3 | 320.023 | 2.60 | 1.48749 | 70.2 |
| 4 | −252.470 | 0.66 | — | — |
| 5 | 50.527 | 3.20 | 1.63930 | 44.9 |
| 6 | 99.516 | 5.47 | — | — |

TABLE 2-continued $F_{NO} = 1:4.0\text{-}4.7\text{-}6.7$
f = 46.60-55.00-77.20
W = 36.0°-32.1°-24.4°
$f_B$ = 20.50-31.71-61.32

| Surface No. | R | D | $N_d$ | $v_d$ |
|---|---|---|---|---|
| 7 | 19.328 | 3.20 | 1.70154 | 41.2 |
| 8 | 24.845 | 5.84 | — | — |
| Diaphragm | ∞ | 2.92-2.92-2.92(∞) | — | — |
|  |  | 2.50-2.50-2.49(finite) |  |  |
| 9 | 27.902 | 3.68 | 1.51634 | 53.3 |
| 10 | −31.156 | 1.40 | 1.80518 | 25.4 |
| 11* | 401.538 | 1.86 | — | — |
| 12 | −372.362 | 1.20 | 1.74147 | 43.3 |
| 13 | 40.527 | 3.03 | 1.74400 | 44.8 |
| 14* | −32.022 | 14.35-10.06-3.20(∞) | — | — |
|  |  | 14.78-10.48-3.63(finite) |  |  |
| 15* | −104.574 | 3.70 | 1.59551 | 39.2 |
| 16 | −24.131 | 0.66 | — | — |
| 17 | −41.296 | 1.60 | 1.78800 | 47.4 |
| 18 | −99.091 | 4.91 | — | — |
| 19 | −18.681 | 2.00 | 1.78800 | 47.4 |
| 20 | −93.353 | — | — | — |

*designates the aspherical surface which is symmetrical with respect to the optical axis.

Aspherical surface data (the aspherical surface coefficients not indicated are zero (0.00)):

| Surface No. | K | A4 | A6 | A8 |
|---|---|---|---|---|
| 11 | 0.00 | $-0.3337 \times 10^{-6}$ | $-0.1356 \times 10^{-7}$ | $0.1375 \times 10^{-9}$ |
| 14 | 0.00 | $0.1594 \times 10^{-4}$ | $0.6002 \times 10^{-7}$ | $-0.1551 \times 10^{-9}$ |
| 15 | 0.00 | $-0.1341 \times 10^{-5}$ | $0.3328 \times 10^{-8}$ | $-0.1816 \times 10^{-11}$ |

Embodiment 3

FIG. 15 shows the lens arrangement of the third embodiment. FIGS. 16A, 16B, 16C and 16D, FIGS. 17A, 17B, 17C and 17D and FIGS. 18A, 18B, 18C and 18D are aberration diagrams, at the short focal length extremity, an intermediate focal length, and at the long focal length extremity, of the lens arrangement shown in FIG. 15 when the zoom lens system is focused on an object at infinity. FIGS. 19A, 19B, 19C and 19D, FIGS. 20A, 20B, 20C and 20D and FIGS. 21A, 21B, 21C and 21D are aberration diagrams, at the short focal length extremity, an intermediate focal length, and at the long focal length extremity, of the zoom lens system shown in FIG. 15 when the zoom lens system is focused on an object at a finite distance (a distance between the object and an image is 2.45 meters). Table 3 shows the numerical data of the above. Surfaces 1 through 13 are those of the positive first lens group 11, surfaces 14 through 19 are those of the negative second lens group 12. Surfaces 7 through 13 within the first lens group are those of the focusing lens group 11F.

TABLE 3

$F_{NO} = 1:4.0\text{-}4.7\text{-}6.7$
f = 46.60-55.00077.20
W = 35.9°-32.0°-24.3°
$f_B$ = 19.54-30.47-59.35

| Surface No. | R | D | $N_d$ | $v_d$ |
|---|---|---|---|---|
| 1 | 71.825 | 2.00 | 1.67840 | 56.1 |
| 2 | 19.283 | 6.62 | — | — |

TABLE 3-continued $F_{NO} = 1:4.0\text{-}4.7\text{-}6.7$
f = 46.60-55.00077.20
W = 35.9°-32.0°-24.3°
$f_B$ = 19.54-30.47-59.35

| Surface No. | R | D | $N_d$ | $v_d$ |
|---|---|---|---|---|
| 3 | 196.788 | 2.60 | 1.49000 | 69.7 |
| 4 | −196.815 | 1.97 | — | — |
| 5 | 52.878 | 2.83 | 1.67770 | 50.5 |
| 6 | 97.227 | 5.54-5.54-5.54(∞) | — | — |
|  |  | 5.04-5.04-5.03(finite) |  |  |
| 7 | 19.676 | 3.20 | 1.65378 | 40.5 |
| 8* | 25.469 | 10.65 | — | — |
| 9 | 32.288 | 3.41 | 1.51633 | 64.1 |
| 10 | −33.824 | 1.40 | 1.80518 | 25.4 |
| 11 | 406.932 | 1.25 | — | — |
| 12 | −230.790 | 2.20 | 1.73077 | 40.5 |
| 13* | −30.094 | 1.20-1.20-1.20(∞) | — | — |
|  |  | 1.70-1.70-1.71(finite) |  |  |
| Diaphragm | ∞ | 13.04-8.80-2.04(OO) | - | - |
|  |  | 13.04-8.80-2.04(finite) |  |  |
| 14 | −97.941 | 3.70 | 1.60000 | 38.4 |
| 15 | −24.633 | 1.08 | — | — |
| 16 | −39.Z28 | 1.60 | 1.78000 | 51.9 |
| 17 | 99.335 | 4.65 | — | — |
| 18 | −18.837 | 2.00 | 1.77250 | 49.6 |
| 19 | −90.523 | — | — | — |

*designates the aspherical surface which is symmetrical with respect to the optical axis.

Aspherical surface data (the aspherical surface coefficients not indicated are zero (0.00)):

| Surface No. | K | A4 | A6 | A8 |
|---|---|---|---|---|
| 8 | 0.00 | $0.1163 \times 10^{-6}$ | $0.2208 \times 10^{-8}$ | — |
| 13 | 0.00 | $0.1502 \times 10^{-4}$ | $0.3162 \times 10^{-7}$ | $0.3123 \times 10^{-10}$ |

Embodiment 4

Figure 3A:
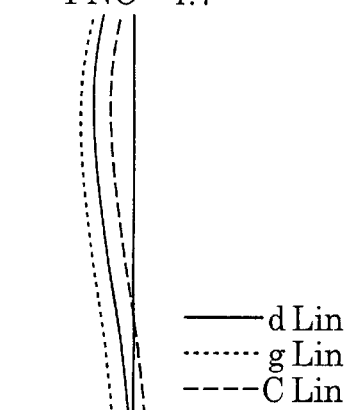
FIGS. 3A, 3B, 3C and 3D are aberration diagrams, at an intermediate focal length, of the zoom lens system shown in FIG. 1 when the zoom lens system is focused on an object at infinity.
Figure 3B:
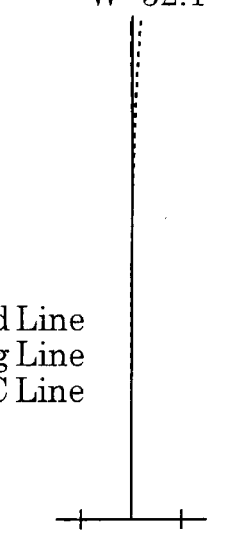
Figure 3C:
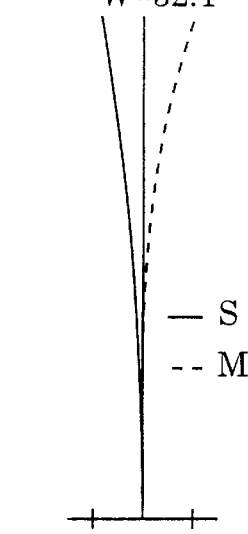
Figure 3D:
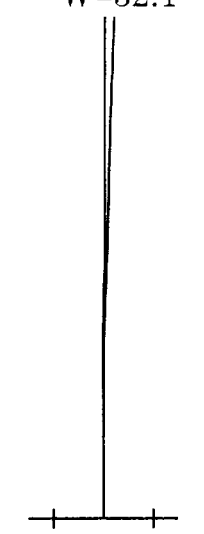
Figure 4A:
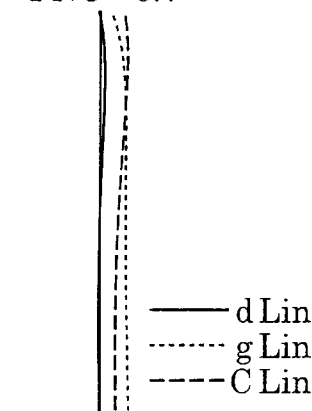
FIGS. 4A, 4B, 4C and 4D are aberration diagrams, at the long focal length extremity, of the zoom lens system shown in FIG. 1 when the zoom lens system is focused on an object at infinity.
Figure 4B:
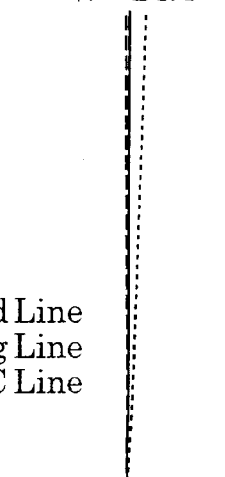
Figure 4C:
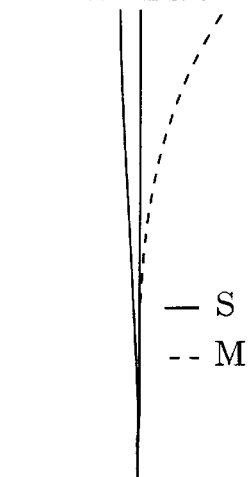
Figure 4D:
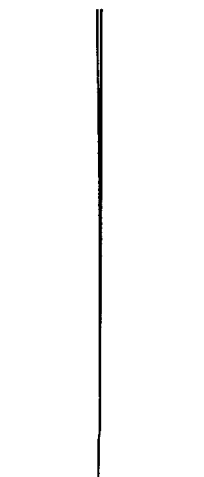
Figures 22, 23D:
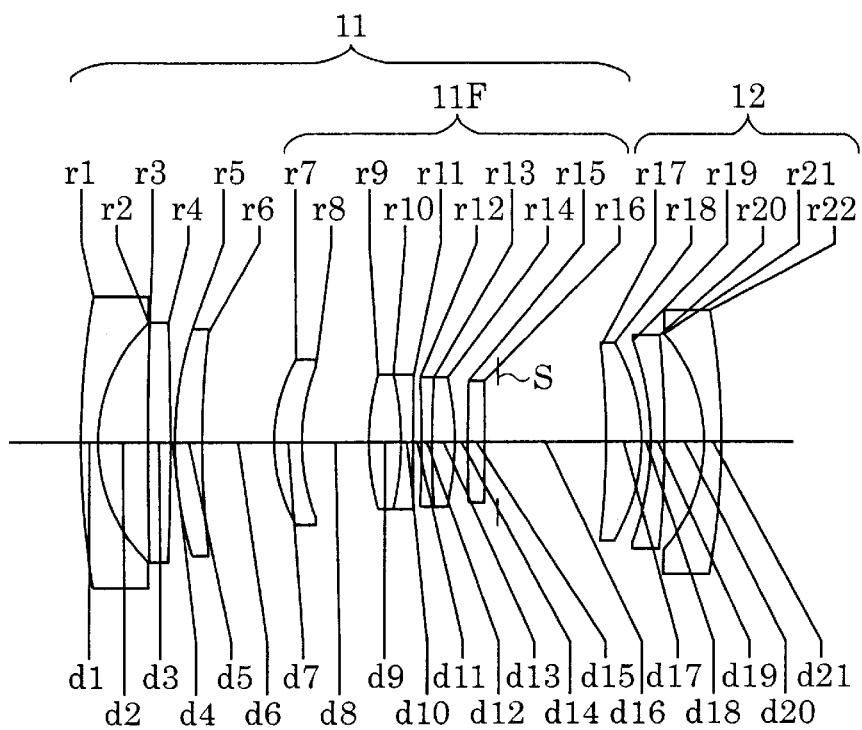
FIG. 22 is a lens arrangement of the fourth embodiment of a zoom lens system according to the present invention.
FIGS. 23A, 23B, 23C and 23D are aberration diagrams, at the short focal length extremity, of the zoom lens system shown in FIG. 22 when the zoom lens system is focused on an object at infinity.
Figure 23A:
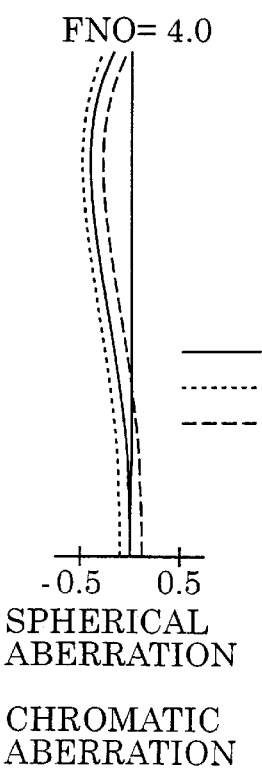
Figure 23B:
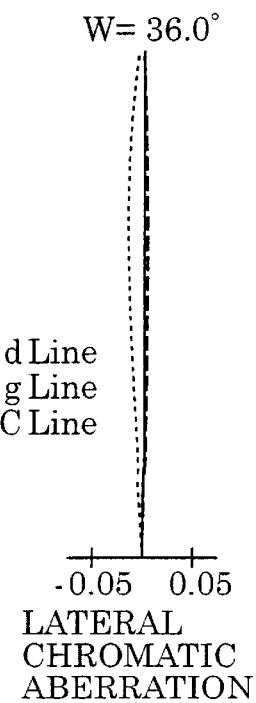
Figure 23C:
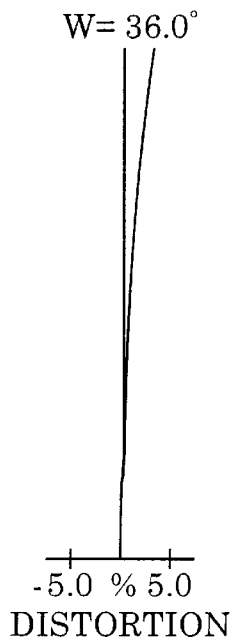

FIG. 22 shows the lens arrangement of the fourth embodiment. FIGS. 23A, 23B, 23C and 23D, FIGS. 24A, 24B, 24C and 24D, and FIGS. 25A, 25B, 25C and 25D are aberration diagrams, at the short focal length extremity, an intermediate focal length, and at the long focal length extremity, of the lens arrangement shown in FIG. 22 when the zoom lens system is focused on an object at infinity. FIGS. 26A, 26B, 26C and 26D, FIGS. 27A, 27B, 27C and 27D and FIGS. 28A, 28B, 28C and 28D are aberration diagrams, at the short focal length extremity, an intermediate focal length, and at the long focal length extremity, of the zoom lens system shown in FIG. 22 when the zoom lens system is focused on an object at a finite distance (a distance between the object and an image is 2.45 meters). Table 4 shows the numerical data of the above. Surfaces 1 through 16 are those of the positive first lens group 11, surfaces 17 through 22 are those of the negative second lens group 12. Surfaces 7 through 16 within the first lens group are those of the focusing lens group 11F.

TABLE 4

$F_{NO} = 1:4.0$-$4.7$-$6.7$
$f = 46.60$-$55.00$-$77.20$
$W = 36.0°$ -$32.2°$ -$24.5°$
$f_B = 19.31$-$30.08$-$58.55$

| Surface No. | R | D | N | $\mu_d$ |
|---|---|---|---|---|
| 1 | 99.912 | 2.00 | 1.69680 | 55.5 |
| 2 | 19.343 | 5.85 | — | — |
| 3 | 514.005 | 2.60 | 1.48749 | 70.2 |
| 4 | −392.456 | 0.55 | — | — |
| 5 | 44.068 | 3.20 | 1.61969 | 43.8 |
| 6 | 114.615 | 8.38 | — | — |
| 7 | 19.562 | 3.20 | 1.67243 | 40.6 |
| 8 | 24.649 | 7.73-7.73-7.73($\infty$) 7.16-7.16-7.16(finite) | — | — |
| 9 | 28.342 | 3.73 | 1.51639 | 54.2 |
| 10 | −33.857 | 1.40 | 1.80518 | 25.4 |
| 11* | 581.621 | 1.00 | — | — |
| 12 | −205.444 | 1.20 | 1.80910 | 47.7 |
| 13 | 115.612 | 2.68 | 1.64627 | 53.3 |
| 14* | −30.243 | 1.50-1.50-1.50($\infty$) 2.06-2.07-2.07(finite) | — | — |
| 15 | 268.394 | 2.00 | 1.51633 | 64.1 |
| 16 | −366.155 | 1.50 | — | — |
| Diaphragm | $\infty$ | 12.66-8.54-1.96($\infty$) 12.66-8.54-1.96(finite) | — | — |
| 17* | −112.079 | 4.08 | 1.60342 | 38.0 |
| 18 | −22.623 | 1.07 | — | — |
| 19 | −33.742 | 1.60 | 1.77250 | 49.6 |
| 20 | −126.855 | 4.58 | — | — |
| 21 | −19.239 | 2.00 | 1.77250 | 49.6 |
| 22 | −86.568 | — | — | — |

*designates the aspherical surface which is symmetrical with respect to the optical axis.

Aspherical surface data (the aspherical surface coefficients not indicated are zero (0.00)):

| Surface No. | K | A4 | A6 | A8 |
|---|---|---|---|---|
| 11 | 0.00 | $0.6907 \times 10^{-6}$ | $-0.4748 \times 10^{-9}$ | $-0.3909 \times 10^{-9}$ |
| 14 | 0.00 | $0.1638 \times 10^{-4}$ | $0.9765 \times 10^{-7}$ | $0.6324 \times 10^{-9}$ |
| 17 | 0.00 | $-0.5118 \times 10^{-5}$ | $-0.8391 \times 10^{-8}$ | $-0.7000 \times 10^{-12}$ |

Table 5 shows the values of each condition of each embodiment.

TABLE 5

| | Embodiment 1 | Emb. 2 | Emb. 3 | Emb. 4 |
|---|---|---|---|---|
| Condition (1) | 0.86 | 0.86 | 0.94 | 0.74 |
| Condition (2) | 0.26 | 0.26 | 0.51 | 0.29 |

Each embodiment satisfies conditions (1) and (2) and aberrations have also been sufficiently corrected.

According to the present invention, in a two-lens group zoom lens system for a compact camera, even when the number of lens elements in the front lens group is increased so that a large amount of light can be collected and high optical performance is obtained, a load otherwise exerted to the focusing mechanism can substantially be removed.

What is claimed is:

1. A zoom lens system comprising a positive first lens group and a negative second lens group in this order from the object side, wherein the distance between said first and second lens groups is varied upon zooming;

wherein one of a middle and a rear portion of said positive first lens group is formed as a focusing lens group so that said focusing lens group can be moved along the optical axis without changing the distance between the most-object side lens surface of said first positive lens group and the image plane when focusing is performed; and wherein the following condition is satisfied:

$$0.5 < f_{1G}/F_f < 1.2$$

wherein $f_{1G}$ designates the focal length of said positive first lens group; and $f_F$ designates the focal length of said focusing lens group in said positive first lens group.

2. The zoom lens system according to claim 1, wherein the following condition is satisfied:

$$0.1 < \Sigma d_F / \Sigma d_{1G} < 0.8$$

wherein $\Sigma d_F$ designates the distance between the most object-side lens surface and the most image-side lens surface of said focusing lens group in said positive first lens group; and $\Sigma d_{1G}$ designates the distance between the most object-side lens surface and the most image-side lens surface of said positive first lens group.

3. A zoom lens system comprising a positive first lens group and a negative second lens group in this order from the object side, wherein the distance between said first and second lens groups is varied upon zooming;

wherein said positive first lens group comprises two sub-lens groups;

wherein one of said sub-lens groups, which is positioned at the image side, functions as a focusing lens group;

wherein focusing is performed by only moving said focusing lens group along the optical axis; and wherein the following condition is satisfied:

$$0.5 < f_{1G}/F_F < 1.2$$

wherein $f_{1G}$ designates the focal length of said positive first lens group; and $f_F$ designates the focal length of said focusing lens group in said positive first lens group.

4. The zoom lens system according to claim 3, wherein the following condition is satisfied:

$$0.1 < \Sigma d_F / \Sigma d_{1G} < 0.8$$

wherein $\Sigma d_F$ designates the distance between the most object-side lens surface and the most image-side lens surface of said focusing lens group in said positive first lens group; and $\Sigma d_{1G}$ designates the distance between the most object-side lens surface and the most image-side lens surface of said positive first lens group.

* * * * *